(12) United States Patent
Perelli et al.

(10) Patent No.: US 7,490,839 B2
(45) Date of Patent: Feb. 17, 2009

(54) LADDER CART

(75) Inventors: Thomas Perelli, Winchester, VA (US); Carl R. Schulz, Winchester, VA (US); Robert J. Tokash, Stephens City, VA (US); Adam Zambanini, Winchester, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 135 days.

(21) Appl. No.: 11/148,409

(22) Filed: Jun. 9, 2005

(65) Prior Publication Data

US 2005/0284697 A1    Dec. 29, 2005

Related U.S. Application Data

(60) Provisional application No. 60/578,305, filed on Jun. 10, 2004, provisional application No. 60/602,653, filed on Aug. 19, 2004, provisional application No. 60/602,889, filed on Aug. 20, 2004, provisional application No. 60/642,518, filed on Jan. 11, 2005, provisional application No. 60/642,523, filed on Jan. 11, 2005.

(51) Int. Cl.
*B62B 3/02* (2006.01)

(52) U.S. Cl. ............... 280/79.3; 280/79.7; 280/47.35

(58) Field of Classification Search ............ 280/79.7, 280/79.3, 47.35

See application file for complete search history.

(56) References Cited

U.S. PATENT DOCUMENTS

| | | | |
|---|---|---|---|
| 2,430,179 A | | 11/1947 | Lanchester |
| 3,684,055 A | | 8/1972 | Rice |
| 3,750,844 A | | 8/1973 | Pandjiris et al. |
| 3,937,329 A | * | 2/1976 | Hammerel ............... 211/41.14 |
| 4,165,088 A | * | 8/1979 | Nelson .................... 280/47.35 |
| D335,736 S | | 5/1993 | Isom |
| 5,294,136 A | | 3/1994 | Dick et al. |
| 5,584,399 A | * | 12/1996 | King ........................ 211/41.15 |
| 5,711,429 A | * | 1/1998 | Brown ..................... 211/41.14 |
| 5,927,731 A | * | 7/1999 | Clarke ........................ 280/79.7 |
| 6,105,797 A | * | 8/2000 | Haisma ................... 211/130.1 |
| 6,109,628 A | | 8/2000 | Scheper |
| 6,206,385 B1 | * | 3/2001 | Kern et al. ............... 280/47.35 |
| 6,260,863 B1 | * | 7/2001 | Orozco et al. .......... 280/33.997 |
| 6,488,160 B2 | * | 12/2002 | Wang ......................... 211/195 |
| 6,497,423 B1 | * | 12/2002 | Perelli et al. ............ 280/47.34 |
| 6,505,844 B2 | * | 1/2003 | Hallman et al. ............ 280/79.7 |
| 6,902,175 B1 | * | 6/2005 | Clavey .................... 280/47.24 |
| 7,219,905 B1 | * | 5/2007 | Wilson ....................... 280/79.7 |
| 2007/0085287 A1 | * | 4/2007 | Wyse ........................ 280/79.3 |

FOREIGN PATENT DOCUMENTS

DE    83 15 331 U1    10/1983

* cited by examiner

*Primary Examiner*—Jeffrey J Restifo
(74) *Attorney, Agent, or Firm*—Foley & Lardner LLP

(57) ABSTRACT

A cart includes rolling members and a frame connected to the rolling members. The frame provides a ladder-storage space. The frame also is configured to hold a ladder in a substantially vertical position with at least a portion of the ladder in the ladder-storage space. The rolling members form a rolling-member perimeter. The ladder-storage space can be disposed within the rolling-member perimeter in the vertical direction. The frame can include a base having a ladder-support surface for contacting and supporting a ladder. The ladder-support surface can be disposed below tops of at least some of the rolling members.

24 Claims, 9 Drawing Sheets

LADDER CART

CROSS-REFERENCE TO RELATED APPLICATIONS

This application claims priority to U.S. Provisional Application Nos. 60/578,305 (filed Jun. 10, 2004), 60/602,653 (filed Aug. 19, 2004), 60/602,889 (filed Aug. 20, 2004), 60/642,518 (filed Jan. 11, 2005), and 60/642,523 (filed Jan. 11, 2005), which are incorporated herein by reference in their entirety.

BACKGROUND

In public facilities, such as hospitals and office buildings, maintenance personnel may be required to change light bulbs daily. A common florescent light fixture has four bulbs that typically are two, three, or four feet long. To change the light bulbs, the maintenance person must bring the replacement bulbs to the light fixture and often must bring a ladder to be able to reach the bulbs in the light fixture.

Carts can be used to bring the replacement bulbs and ladder to the light fixture. Such carts can be handmade or modifications of a utility cart designed for another application. For example, maintenance personnel may attach a vertically oriented ladder to the front of a utility cart or may attach a horizontally oriented ladder to a side of the utility cart. There are problems associated with using a conventional utility cart to carry the ladder in this manner.

A ladder carried on a utility cart can be prone to impacting and damaging walls. The ladder can project beyond the footprint of the cart. Consequently, the ladder is more likely to contact items, such as walls, while the cart is being moved.

A ladder carried on a utility cart can be prone to falling off of the cart. The utility cart is not designed to carry the ladder and consequently the ladder may not be sufficiently secure. When the cart is subjected to impact, e.g., it passes over a threshold or something bumps into the cart, the ladder may fall off the cart.

A utility cart carrying a ladder can be difficult to maneuver. A utility carts is often long, which makes it difficult to maneuver in hallways and around room obstacles. Furthermore, the ladder can increase the overall footprint of the cart, thus further decreasing the cart's maneuverability.

A utility cart used to carry light bulbs and a ladder may lack desired capacity, organization, and security. A conventional utility cart may not have enough shelf space to carry needed items, such as bulbs (it may be desirable to carry a variety of bulbs), tools, supplies, and business related materials. The cart may include shelves for carrying items, but the shelves may not be conducive to organization of the items. Additionally, the cart may not provide desired security because the shelves are often open, i.e., they are not fully enclosed.

Additionally, utility carts can be an eyesore in a public space. This is particularly true for a cart that is handmade or modified to accommodate light bulbs and a ladder.

A two-wheeled cart has been proposed that is designed to carry bulbs and a ladder. A two-wheeled cart can be more difficult to maneuver than a cart having three or more wheels. Moreover, the two-wheeled cart suffers from at least some of the issues mentioned above.

A four-wheeled cart has been proposed that is designed to carry bulbs and a relatively small ladder. The cart suffers from at least some of the issues mentioned above.

SUMMARY

An aspect of the present invention relates to a cart comprising a plurality of rolling members and a frame connected to the rolling members. The frame provides a ladder-storage space. The frame is configured to hold a ladder in a substantially vertical position with at least a portion of the ladder in the ladder-storage space. The rolling members form a rolling-member perimeter. The ladder-storage space is disposed within the rolling-member perimeter in the vertical direction.

Another aspect of the present invention relates to a cart comprising a plurality of rolling members and a frame connected to the rolling members. The frame provides a ladder-storage space. The frame is configured to hold a ladder with at least a portion of the ladder in the ladder-storage space. The frame includes a base having a ladder-support surface for contacting and supporting a ladder. The ladder-support surface is disposed below the tops of at least some of the rolling members.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
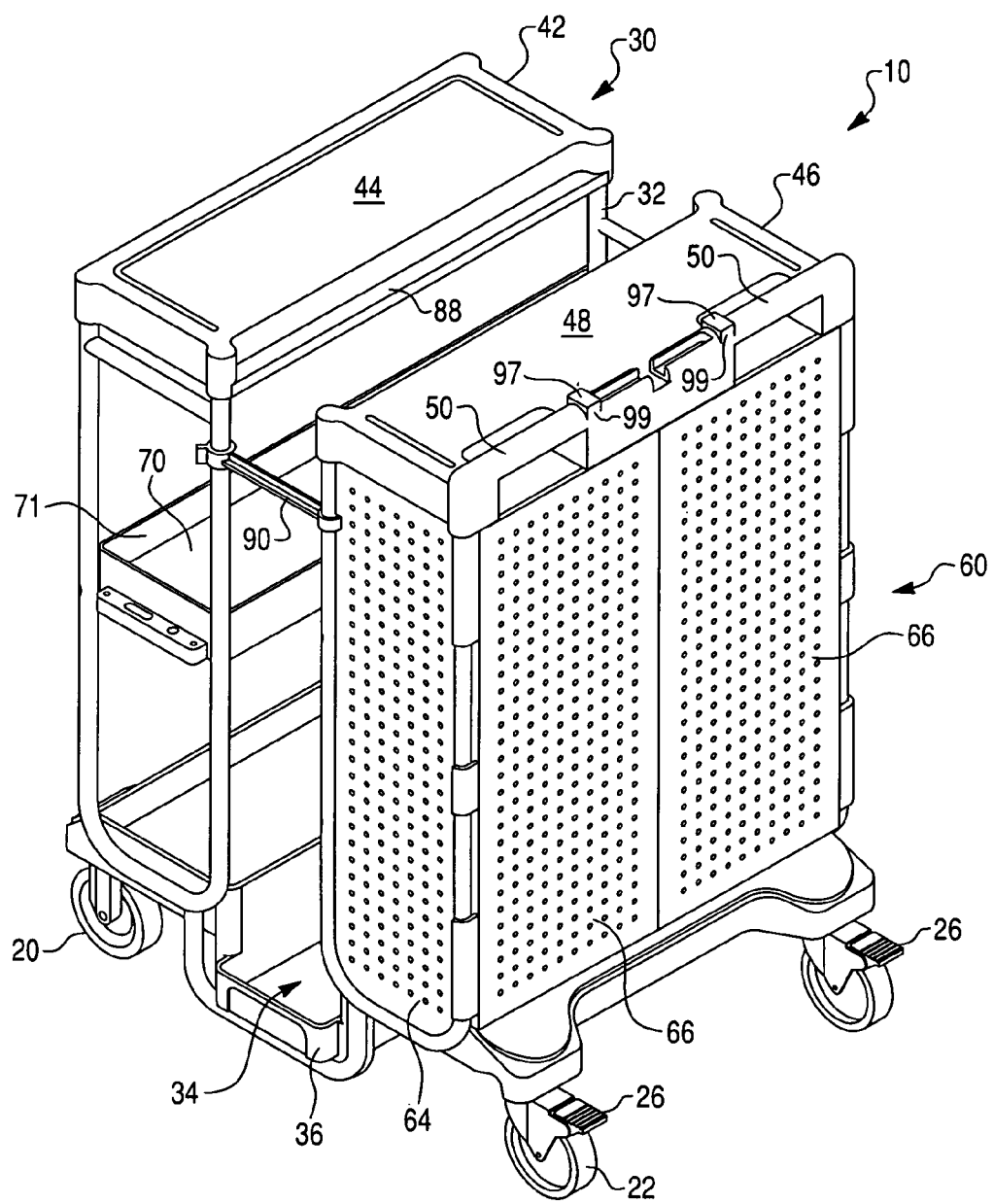
FIG. 1 is a left, rear perspective view of a first embodiment of a ladder cart according to the present invention.
Figure 2:
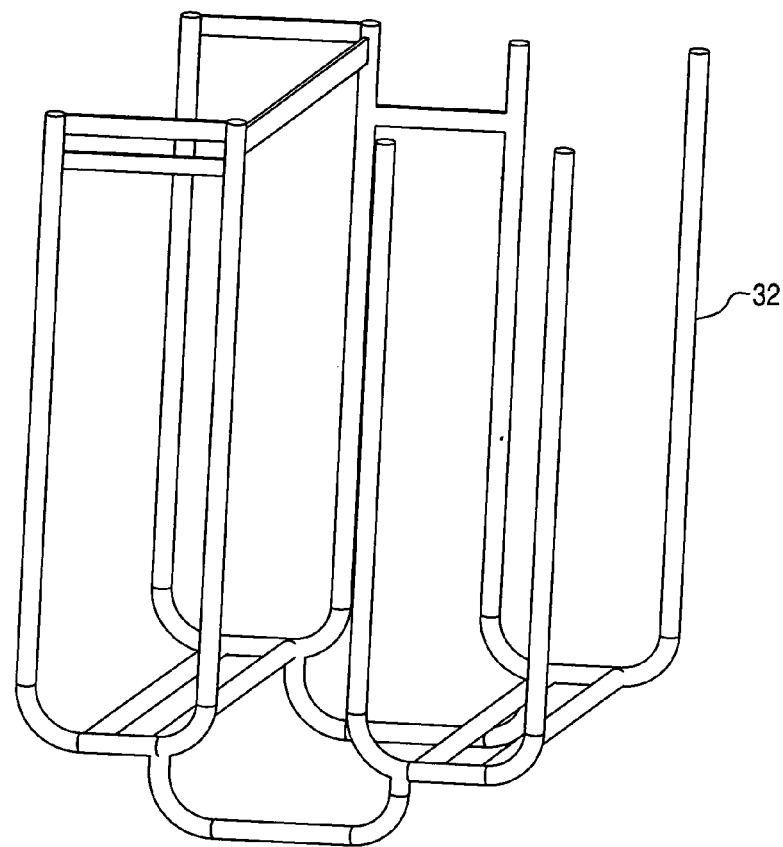
FIG. 2 is a left, rear perspective view of structural members of the ladder cart of FIG. 1.
Figure 3:
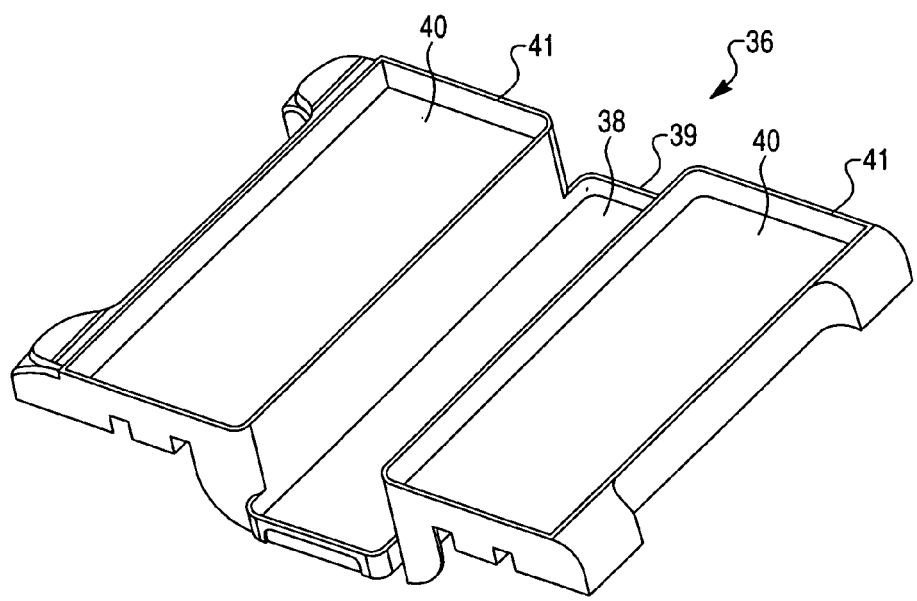
FIG. 3 is a left, rear perspective view of a base of the ladder cart of FIG. 1.

Presently preferred embodiments of the invention are illustrated in the drawings. An effort has been made to use the same or like reference numbers throughout the drawings to refer to the same or like parts.

A first embodiment of a ladder cart 10 according to the present invention is shown in FIGS. 1-11. The ladder cart 10 includes a plurality of rolling members 20, 22 and a frame 30.

Figure 5:
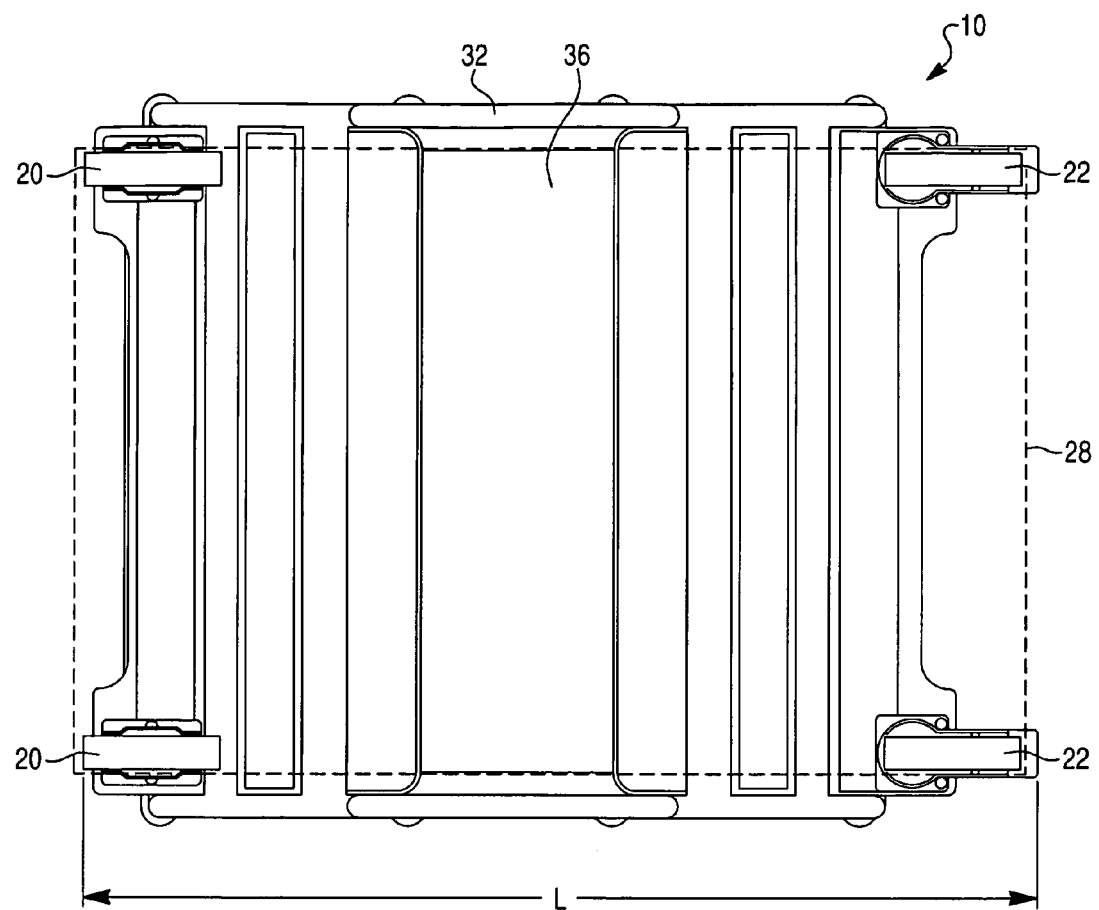
FIG. 5 is a bottom view of the ladder cart of FIG. 1.

The plurality of rolling members 20, 22 are provided to facilitate movement of the ladder cart 10. The rolling members 20, 22 can be, for example, conventional casters. Preferably the casters have five inch wheels 24. Wheels 24 of this size are useful in certain environments because they can readily roll over fairly sizable impediments despite the weight of the loaded ladder cart 10. This preferred embodiment includes fixed casters 20, which cannot swivel, and swiveling casters 22. Preferably each of the swiveling casters 22 has a conventional caster lock 26 that can be used to prevent the wheel 24 from rolling. Alternatively, the rolling members could be wheels mounted on an axle connected directly to the frame 30 (not shown). The rolling members 20, 22 form a rolling-member perimeter 28, as shown in FIG. 5. The size and shape of the rolling-member perimeter 28 can change as the swiveling casters 22 swivel. The significance of the rolling-member perimeter 28 will be explained below.

The frame 30 can include a plurality of structural members 32 connected by conventional means. The structural members 32 are shown in isolation in FIG. 2. The structural members 32 preferably are formed of metal and most of them have a tubular construction.

Figure 4:
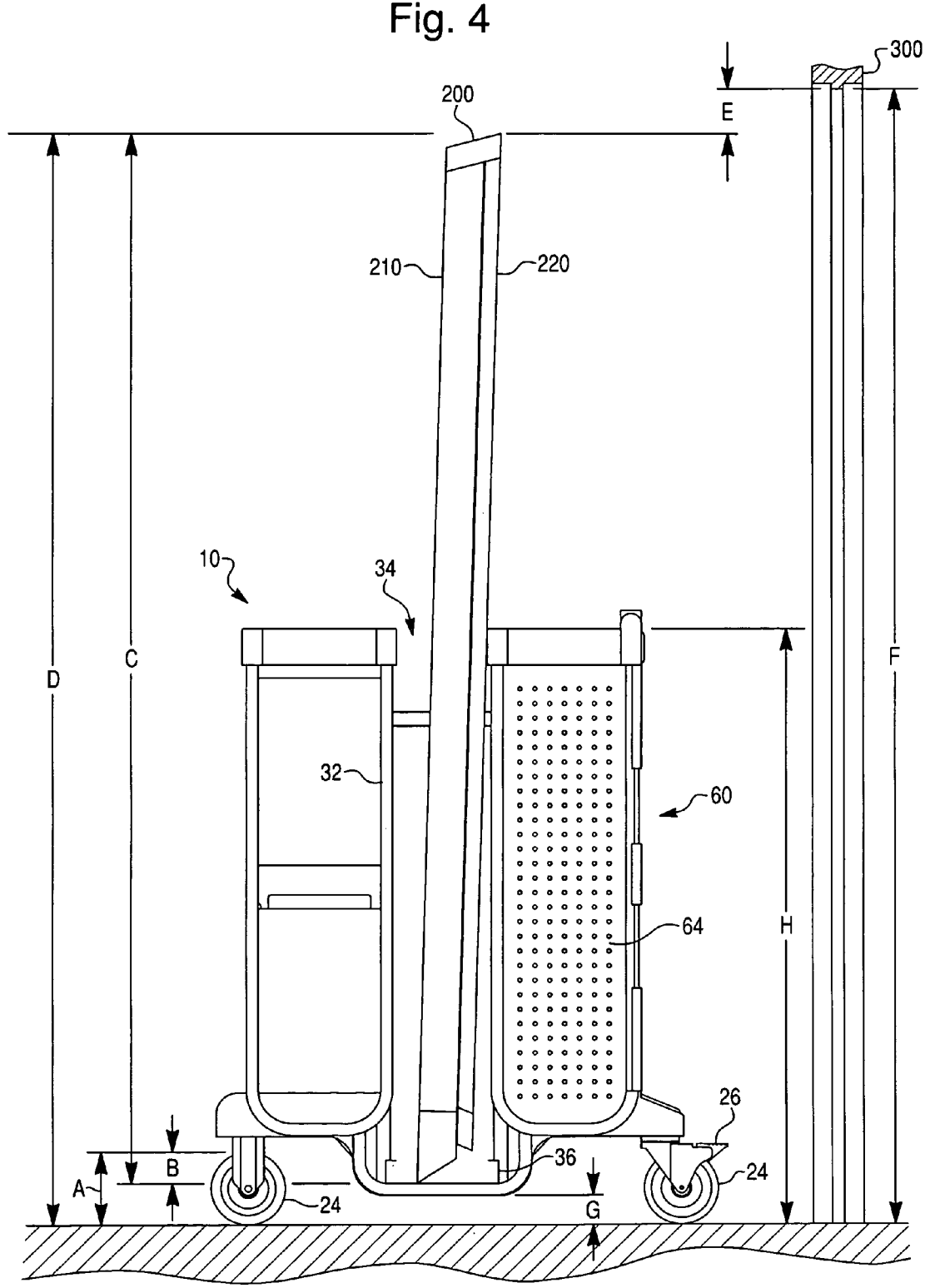
FIG. 4 is a left side, partial cross-sectional view of the ladder cart of FIG. 1 carrying a ladder.

The frame 30 also can include a base 36 mounted on the structural members 32 by conventional means. The base 36 is shown in isolation in FIG. 3. Preferably the base is an integral member formed of plastic. The base 36 can have a ladder-support surface 38 for contacting and supporting a ladder 200. Preferably, the ladder-support surface 38 is disposed below tops of at least some of the rolling members 20, 22, as shown in FIG. 4. The base also can include shelf surfaces 40 disposed on opposing sides of the ladder-support surface 38. The base 36 can include sidewalls 39 and 41 that surround the ladder-support surface 38 and the shelf surfaces 40, respectively.

Figure 7:
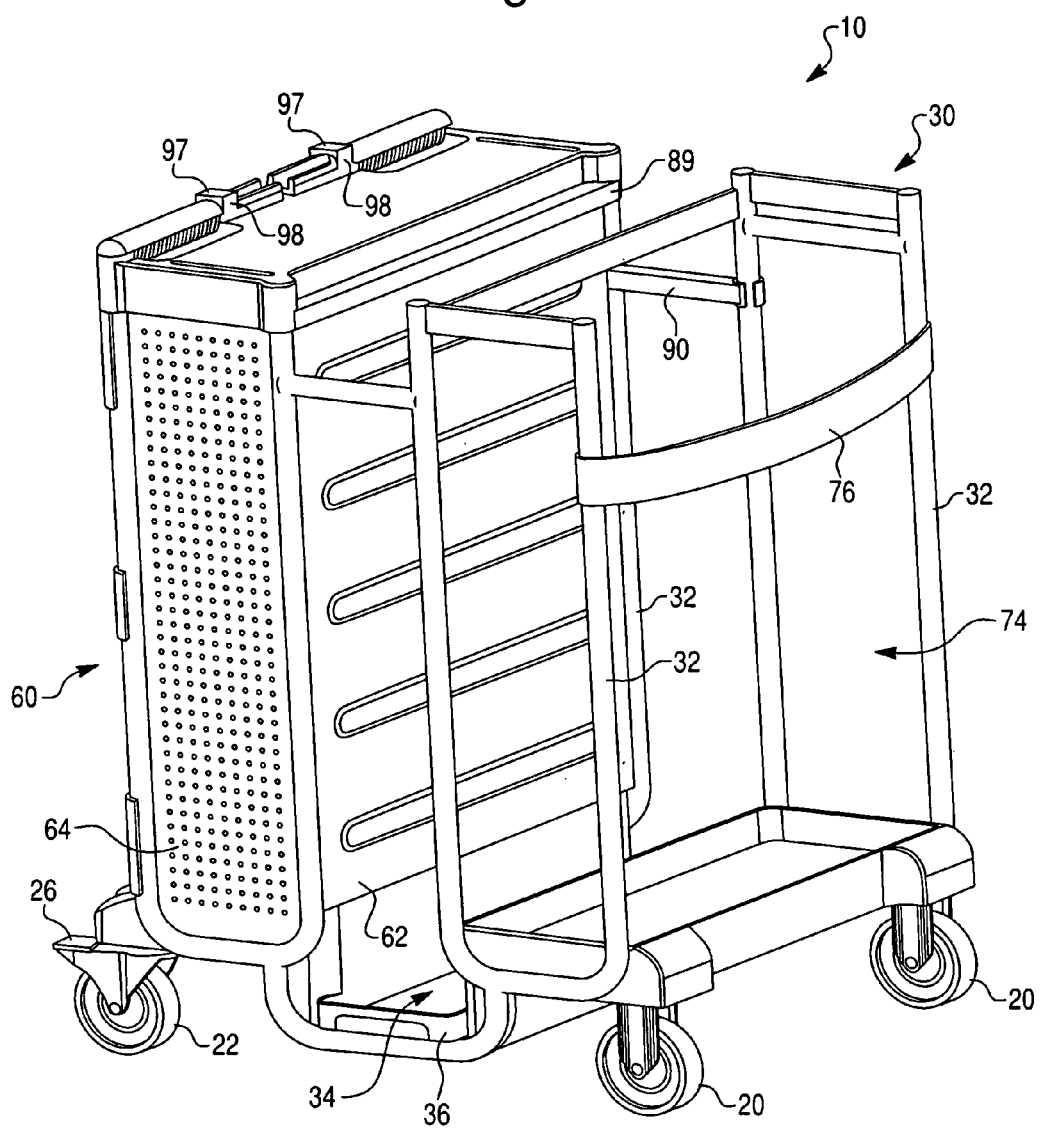
FIG. 7 is a right, front perspective view of the ladder cart of FIG. 1 with a first member and a shelf omitted.

As shown in FIG. 1, the frame 30 can include a first member 42 providing a first work surface 44 on a first side of a ladder-storage space (shown generally as 34) and a second member 46 providing a second work surface 48 on a second side of the ladder-storage space 34. The second member 46 can include handles 50 that facilitate pushing and pulling of the cart 10. As shown in FIGS. 1 and 7, the second member 46 also can include structure 97 for fixing a position of an item (not shown), such as a conduit, for cutting. The structure 97 can include a first substantially flat face 98 (see FIG. 7) against which the item can be placed to establish its position. A leg of a vise (not shown) can be placed against the item to hold it in position against the first substantially flat face 98. The structure 97 can also include a second substantially flat face 99 (see FIG. 1), which can receive another leg of the vise. The first and second members 42, 46 preferably are made of plastic.

The frame 30 can define the ladder-storage space 34. The ladder-storage space 34 is intended to receive a ladder 200, as shown in FIG. 4 (in this figure, a mechanism 90 has been omitted and a portion of the base 36 is shown in cross-section to facilitate the view of the ladder 200). Preferably, the ladder-storage space 34 is within the frame 30, i.e., it is arranged such that neither of the two major faces 210 and 220 of the ladder 200 is uncontained. In this preferred embodiment, the ladder-storage space 34 extends from below the tops of the rolling members 20, 22 through a top of the frame 30 (see FIG. 4). More preferably, the ladder storage space 34 is below tops of the wheels 24 of the rolling members 20, 22.

The cart 10 can be configured to provide a desired amount of maneuverability and stability. For example, as shown in FIG. 4, the cart 10 can have wheels 24 with a diameter A of preferably approximately five inches. Wheels 24 with such a diameter can more readily roll over expected impediments, such as door thresholds. The ladder-support surface 38 is configured to be a distance B below the tops of the wheels 24. Preferably the distance B is at least approximately two inches. By placing the ladder-support surface 38 below the tops of the wheels 24, there will be sufficient clearance to ensure that the ladder 200 will be able to pass through a standard door frame 300. A standard six-foot ladder 200 typically has a height C of seventy four inches in a folded position. If the distance B is at least two inches below a top of a five inch wheel 24, the overall height D of the ladder 200 will be no greater than seventy seven inches. This provides sufficient clearance E to ensure that the ladder 200 will not contact the top of the door frame 300, which typically has a height F of seventy nine to eighty inches. Preferably the cart 10 has a bottom clearance height G that is at least approximately two inches to ensure that the cart 10 does not become stuck on expected impediments, such as an apex of an access ramp.

The frame 30 can be configured to hold the ladder 200 in a substantially vertical position with at least a portion of the ladder 200 in the ladder-storage space 34. As shown in FIG. 4, the ladder 200 is held substantially vertically, i.e., within about 20 degrees of vertical. More preferably, the ladder is held within about 10 degrees of vertical and, even more preferably, within about 3 degrees of vertical.

Holding the ladder 200 in a substantially vertical position allows the cart 10 to maintain a compact size while keeping the ladder-storage space 34 and the ladder within the rolling-member perimeter 28, which is shown in FIG. 5. A preferred amount of stability can be achieved by disposing the ladder-storage space 34 within the rolling-member perimeter 28 in the vertical direction. More preferably, the frame 30 is configured to store the ladder 200 such that the entire ladder 200 is contained within the rolling-member perimeter 28 in the vertical direction. As mentioned above, the rolling-member perimeter 28 may change in shape as the swiveling casters 22 swivel. For the purpose of obtaining preferred stability, the ladder 200 only need be within the rolling-member perimeter 28 at least during some point of the swiveling of the swiveling casters 22.

The ladder cart 10 can include a mechanism 90 configured to maintain a ladder 200 in the ladder-storage space 34. The mechanism 90 is shown in an enlarged view in FIG. 11. The mechanism 90 can include a closed end 92 that is configured to surround and rotate around one of the structural members 32. The mechanism 90 can also include an open end 94 that is configured to releasably grip another of the structural members 32. A handle 96 provides a gripping surface that facilitates pulling the open end 94 off the structural member 32 to open the ladder-storage space 34 for insertion or removal of the ladder 200. Preferably the mechanism 90 is made of plastic.

Figure 6:
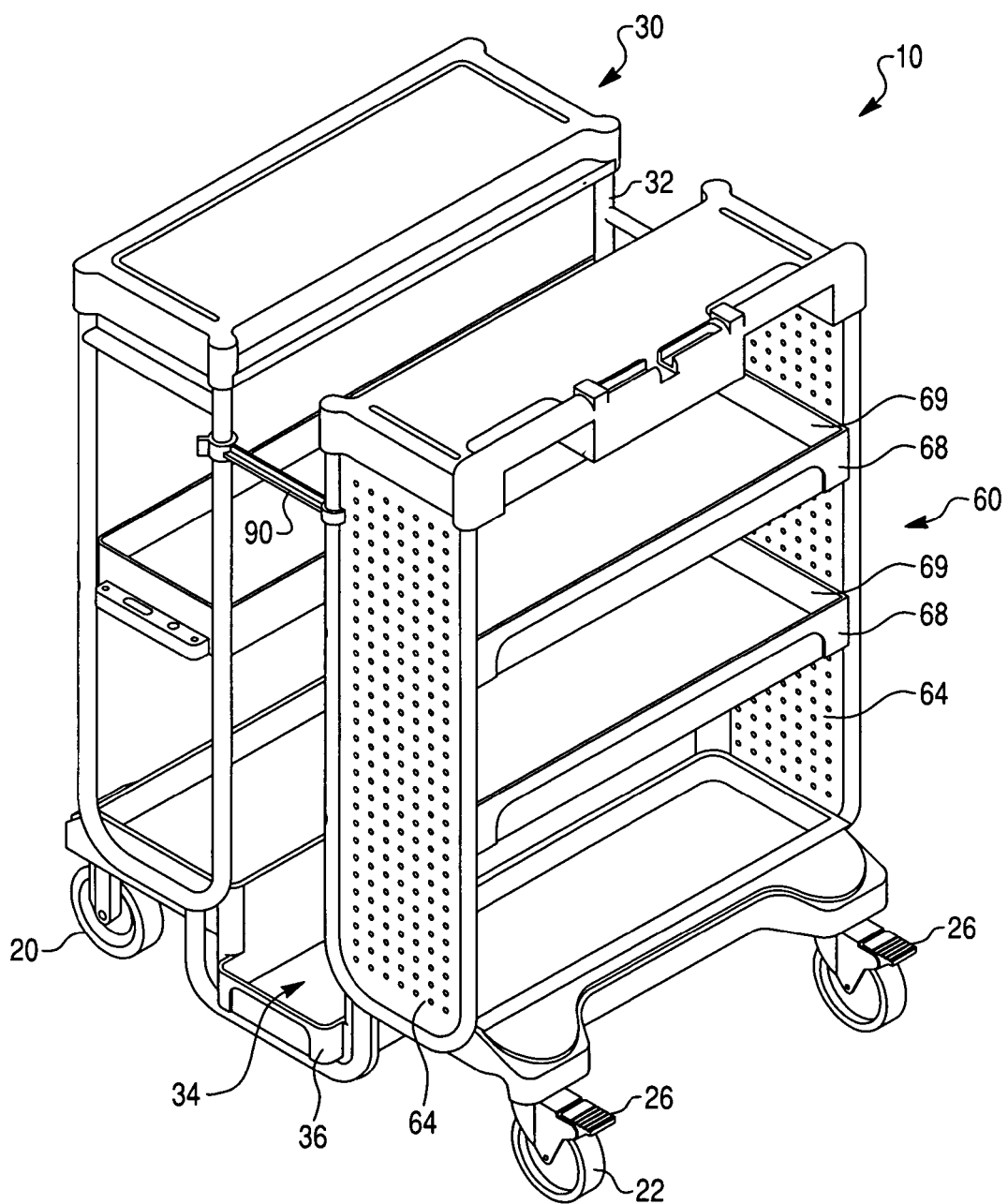
FIG. 6 is a left, rear perspective view of the ladder cart of FIG. 1 with doors omitted.

The ladder cart 10 can include a cabinet portion 60 for storing items. The cabinet portion 60 can include a back panel 62 (see FIG. 7), two side panels 64, and two door panels 66. The door panels 66 can be mounted by conventional hinges (not shown) to permit them to move between open and closed positions. A lock (not shown) can also be provided to permit the door panels 66 to be locked in the closed position. In FIG. 6, the door panels 66 have been omitted to permit illustration of the shelves 68 contained within the panels 62, 64, 66. Each shelf 68 can include a sidewall 69 that helps maintain items on the shelf 68. The shelves 68 can be mounted to structural members 32 by conventional means. The shelves 68 could be made, for example, of plastic.

The ladder cart 10 can include at least one shelf 70 that can be removably disposed on the structural members 32 (see FIG. 1) by conventional means. The shelf 70 can include a sidewall 71 that helps maintain items on the shelf 70. The shelf 70 could be made, for example, of plastic. Removal of shelf 70 and the first member 42, as shown in FIG. 7, can provide storage space (generally designated as 74) for storing larger items. For example, the storage space 74 can be used to store bulbs. A conventional strap 76 can be provided to extend between structural members 32 and maintain items in the storage space 74.

Figure 8:
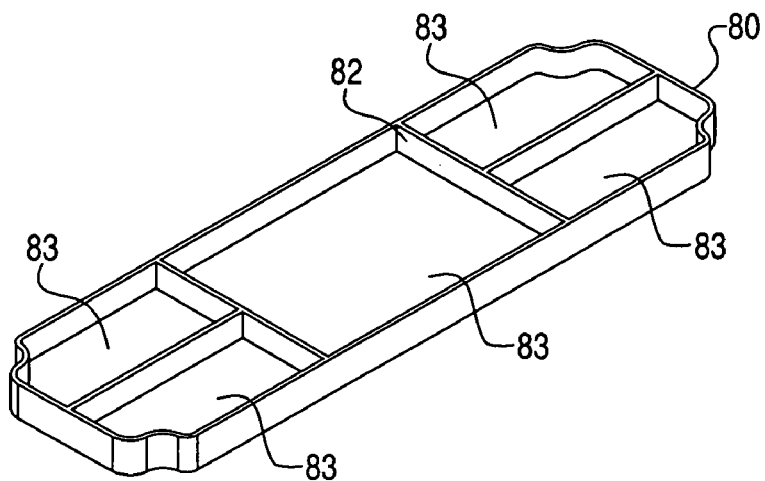
FIG. 8 is a left, rear perspective view of one side of a third member for the ladder cart of FIG. 1.
Figure 9:
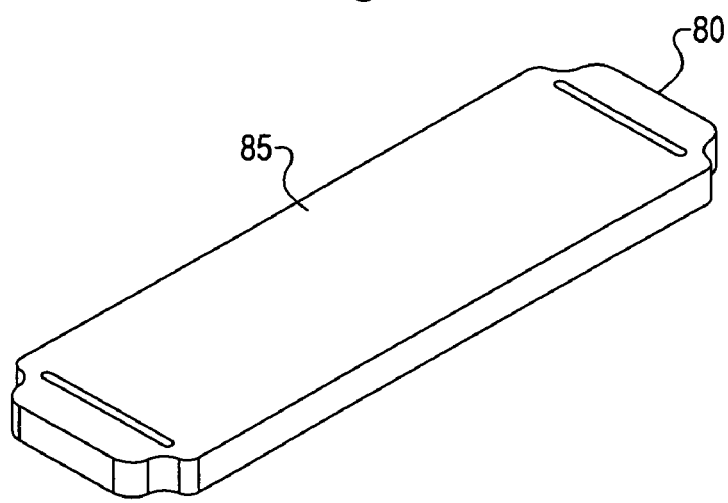
FIG. 9 is a left, rear perspective view of another side of a third member for the ladder cart of FIG. 1.
Figure 10:
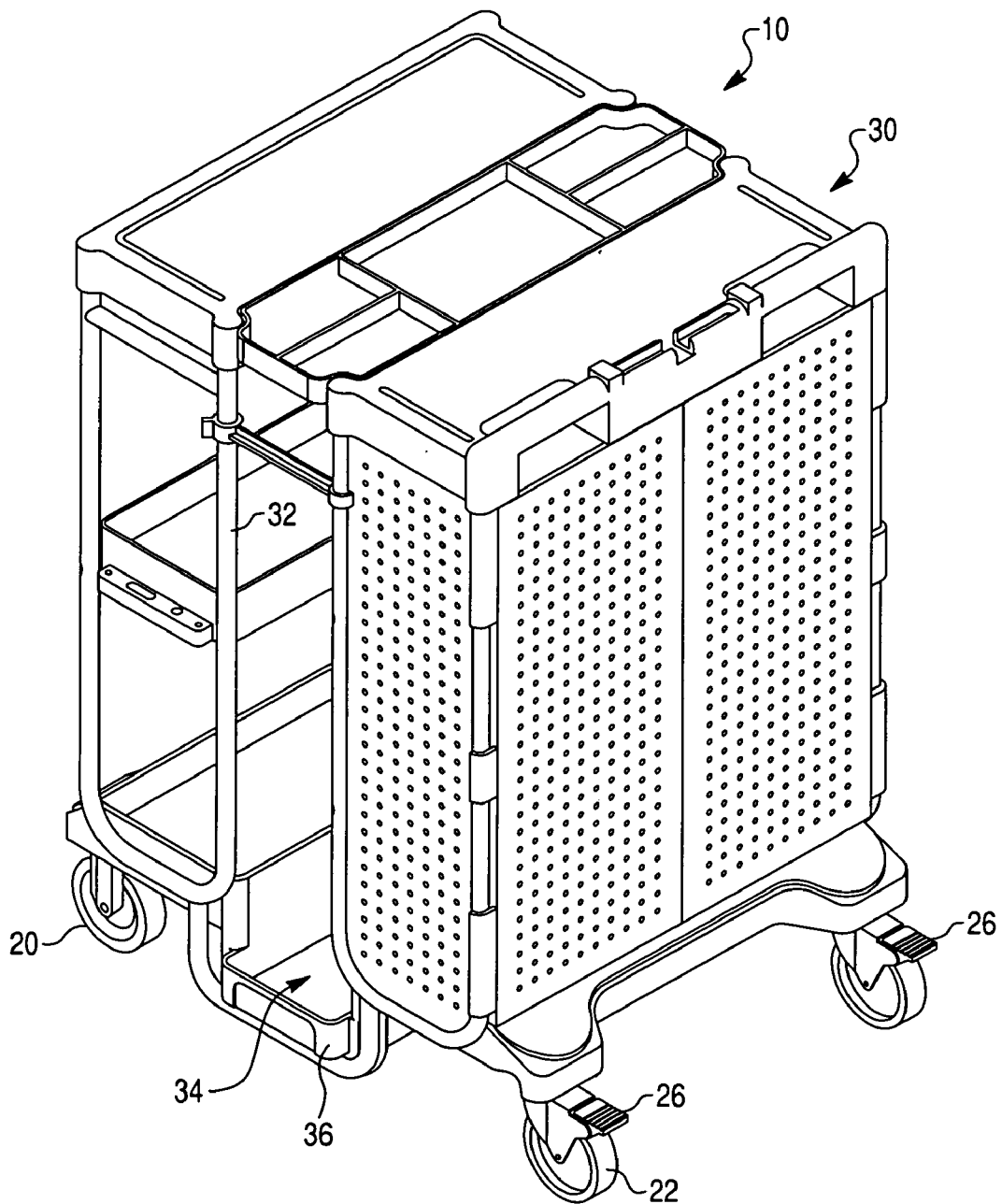
FIG. 10 is a left, rear perspective view of the ladder cart of FIG. 1 having the third member.
Figure 11:
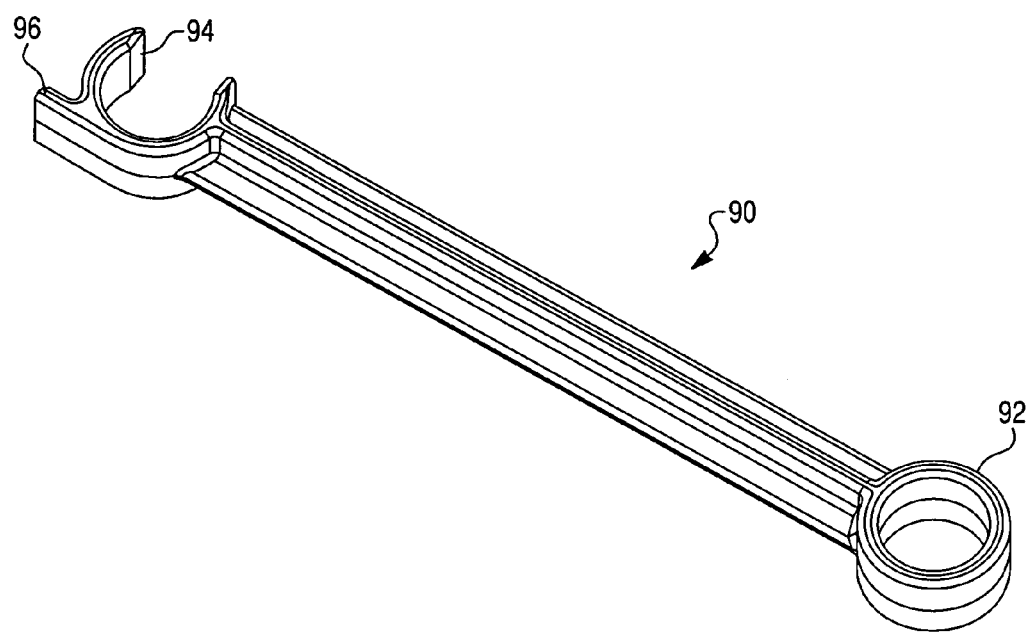
FIG. 11 is left, rear perspective view of a mechanism for the ladder cart of FIG. 1.

The ladder cart 10 may also include a third member 80 configured to be disposed in the ladder-storage space 34, in the absence of a ladder 200. As shown in FIG. 8, the third member 80 can include, on one side, a storage surface 82 having a plurality of storage compartments 83. As shown in FIG. 9, the third member 80 can also include, on another side, a third work surface 85. The third member 80 can be disposed in the ladder-storage space 34 such that either the storage surface 82 or the third work surface 85 faces upward. In FIG. 10, the third member 80 is disposed in the ladder-storage space 34 with the storage surface 82 facing upward. Thus, the storage surface 82 is provided between the first and second work surfaces 44, 48. If the third work surface 85 faces upward, a substantially uninterrupted work surface is provided by the first, second, and third work surfaces 44, 48, 85. When disposed in the ladder-storage space 34, the third member 80 can rest on a protrusion 88 (see FIG. 1) of the first member 42 and a protrusion 89 of the second member 46 (see FIG. 7). The third member 80 is preferably made of plastic.

A ladder cart 10 according to the present invention can be configured such that it is not prone to impacting and damaging items, such as walls and heads of door frames. For example, the ladder cart 10 can be configured such that the ladder 200 does not project beyond the footprint of the ladder cart 10 (and more preferably stays within the rolling-member perimeter). Thus, the ladder 200 is less prone to contacting items, such as walls, while the ladder cart 10 is being moved. Additionally, the ladder cart 10 can be configured to hold that ladder 200 at a lower vertical position, making it less likely to contact items such as the head of a door frame.

A ladder cart 10 according to the present invention can be configured such that a ladder 200 is not prone to falling off of the ladder cart 10. The ladder cart 10 can be specifically designed to carry the ladder 200 and to do so securely. Thus, when the ladder cart 10 is subjected to impact, e.g., passing over a threshold, the ladder 200 is less likely to fall off the ladder cart 10.

A ladder cart 10 according to the present invention can be configured such that it is easier to maneuver. The ladder cart 10 can have a footprint that is not horizontally elongated, i.e., it is close to square. The ladder cart 10 also can have a height H (see FIG. 4) of approximately forty two inches that is greater than its length dimension L (see FIG. 5) of thirty six inches. This results in a ladder cart 10 that has a greater vertical component. This make it easier to maneuver the ladder cart 10 around the obstacles and corners. The greater height dimension H also allows a shorter swing length without losing capacity of the ladder cart 10. In addition, it provides a better/ergonomic work height H than a typical utility cart. The ladder 200 also can be kept within the overall footprint of the ladder cart 10, so it will not reduce the cart's maneuverability.

A ladder cart 10 according to the present invention can be configured such that it has desired capacity, organization, and security. The shelves can be made higher and shallower than utility carts. This makes it easier to access, see and organize what is on a shelf. Additionally, increasing the cart's height over traditional utility carts can allow for increased capacity because of the ability to organize.

A ladder cart 10 according to the present invention can be configured such that it is aesthetically pleasing. This can be true from the perspective of the organization of tools as well as the handling of the ladder 200. For example, it could have attractive non-structural cover panels to hide and protect all stored items.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A cart comprising:
    a plurality of rolling members; and
    a frame comprising structural members and a base having a ladder-support surface for receiving a removable ladder, the structural members and base forming a ladder-storage space for receiving at least a portion of the ladder, the structural members being disposed on opposite sides of the ladder when the ladder is in the ladder-storage space and positioned so as to be able to contact either of longer sides of the ladder, the structural members being configured to hold the ladder in a substantially vertical position, the structural members comprising at least two structural members supporting a shelf surface adjacent to the ladder-storage space; and
    wherein the rolling members form a rolling-member perimeter, and the ladder-storage space is disposed within the rolling-member perimeter in the vertical direction, and
    wherein the ladder-support surface is disposed below tops of at least some of the rolling members,
    wherein the shelf surface comprises a first work surface on a first side adjacent to the ladder-storage space and a second work surface on a second side adjacent to the ladder-storage space,
    wherein a removable member is configured to be disposed in the ladder-storage space, in absence of the ladder, adjacent to the first and second work surfaces.

2. The cart of claim 1, wherein the rolling members include wheels, and the ladder support surface is disposed below tops of at least some of the wheels.

3. The cart of claim 1, wherein the ladder-storage space extends from below tops of at least some of the plurality of rolling members through a top of the frame.

4. The cart of claim 1, wherein the storage space is within the frame.

5. The cart of claim 1, wherein the storage space of the frame is configured to store the ladder such that the entire ladder is contained within the rolling-member perimeter in the vertical direction.

6. The cart of claim 1, further comprising a mechanism configured to maintain the ladder in the storage space.

7. The cart of claim 1, wherein the removable a third work surface disposed between the first and second work surfaces.

8. The cart of claim 1, wherein the removable at least one storage location between the first and second work surfaces.

9. The cart of claim 1, further comprising at least one removable shelf that can be removably disposed on the frame.

10. The cart of claim 9, wherein the removal of the removable shelf provides a bulb-storage space for storing bulbs.

11. The cart of claim 1, further comprising structure for fixing a position of an item for cutting.

12. The cart of claim 1, wherein the frame includes a portion on a first side of the ladder-support surface including a first plurality of shelves arranged vertically and a portion on a second side of the ladder-support surface including a second plurality of shelves arranged vertically.

13. A cart comprising:

a plurality of rolling members; and a frame comprising structural members and a base having a ladder-support surface for receiving a removable ladder, the structural members and base forming a ladder-storage space for receiving at least a portion of the ladder, the structural members being disposed on opposite sides of the ladder when the ladder is in the ladder-storage space and positioned so as to be able to contact either of longer sides of the ladder, the structural members comprising at least two structural members supporting a shelf surface adjacent to the ladder-storage space; and wherein the ladder-support surface is disposed below tops of at least some of the rolling members, wherein the shelf surface includes a first work surface adjacent to a first side of the ladder-storage space and a second work surface adjacent to a second side of the ladder-storage space, and wherein a removable member is configured to be disposed in the ladder-storage space, in the absence of the ladder, adjacent to the first and second work surfaces.

14. The cart of claim 13, wherein the storage space is within the frame.

15. The cart of claim 13, wherein the rolling members include wheels, and the ladder support surface is disposed below tops of at least some of the wheels.

16. The cart of claim 13, wherein the rolling members form a rolling-member perimeter, and the ladder-storage space is disposed within the rolling-member perimeter in the vertical direction.

17. The cart of claim 16, wherein the storage space of the frame is configured to store the ladder such that the entire ladder is contained within the rolling-member perimeter in the vertical direction.

18. The cart of claim 13, further comprising a mechanism configured to maintain the ladder in the storage space.

19. The cart of claim 13, wherein the removable of the ladder a third work surface disposed between the first and second work surfaces.

20. The cart of claim 13, wherein the removable member is at least one storage location between the first and second work surfaces.

21. The cart of claim 13, further comprising at least one removable shelf that can be removably disposed on the frame.

22. The cart of claim 21, wherein the removal of the removable shelf provides a bulb-storage space for storing bulbs.

23. The cart of claim 13, further comprising structure for fixing a position of an item for cutting.

24. The cart of claim 13, wherein the frame includes a portion on a first side of the ladder-support surface including a first plurality of shelves arranged vertically and a portion on a second side of the ladder-support surface including a second plurality of shelves arranged vertically.

* * * * *